(12) United States Patent
Makino

(10) Patent No.: US 8,179,973 B2
(45) Date of Patent: May 15, 2012

(54) IMAGE CODING APPARATUS AND METHOD

(75) Inventor: Jun Makino, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 1420 days.

(21) Appl. No.: 11/740,088

(22) Filed: Apr. 25, 2007

(65) Prior Publication Data

US 2007/0253490 A1 Nov. 1, 2007

(30) Foreign Application Priority Data

Apr. 27, 2006 (JP) ................. 2006-124007
Feb. 22, 2007 (JP) ................. 2007-042661

(51) Int. Cl.
*H04N 5/937* (2006.01)
(52) U.S. Cl. ................................. 375/240.24
(58) Field of Classification Search ............. 375/240.24, 375/240.26, E7.175, E7.176, E7.146, E7.18, 375/E7.151
See application file for complete search history.

(56) References Cited

U.S. PATENT DOCUMENTS

| 5,557,331 A | 9/1996 | Honjo | |
| 2003/0140347 A1* | 7/2003 | Varsa | 725/90 |

FOREIGN PATENT DOCUMENTS

| JP | 07-015729 A | 1/1995 |
| JP | 2004235683 | 8/2004 |
| JP | 2005124041 A | 5/2005 |

* cited by examiner

*Primary Examiner* — Gilberto Barron, Jr.
*Assistant Examiner* — Izunna Okeke
(74) *Attorney, Agent, or Firm* — Canon U.S.A., Inc. IP Division

(57) ABSTRACT

An image coding apparatus includes: a division unit configured to divide a coding target picture included in an input video signal into a plurality of slices each including one or more data blocks; a coding unit configured to code the video signal in a unit of the slice divided by the division unit; and a setting unit configured to set at least one of a division position of the slice and a number of divisions of the slice, to the division unit. In the image coding apparatus, the setting unit sets at least one of the division position of the slice and the number of divisions of the slice so that slice boundaries differ from each other between adjacent pictures.

27 Claims, 19 Drawing Sheets

BOUNDARY OF SLICES

○ : SLICE DIVISION POSITION IN PICTURE

○ : SLICE DIVISION POSITION IN PICTURE

I : I SLICE

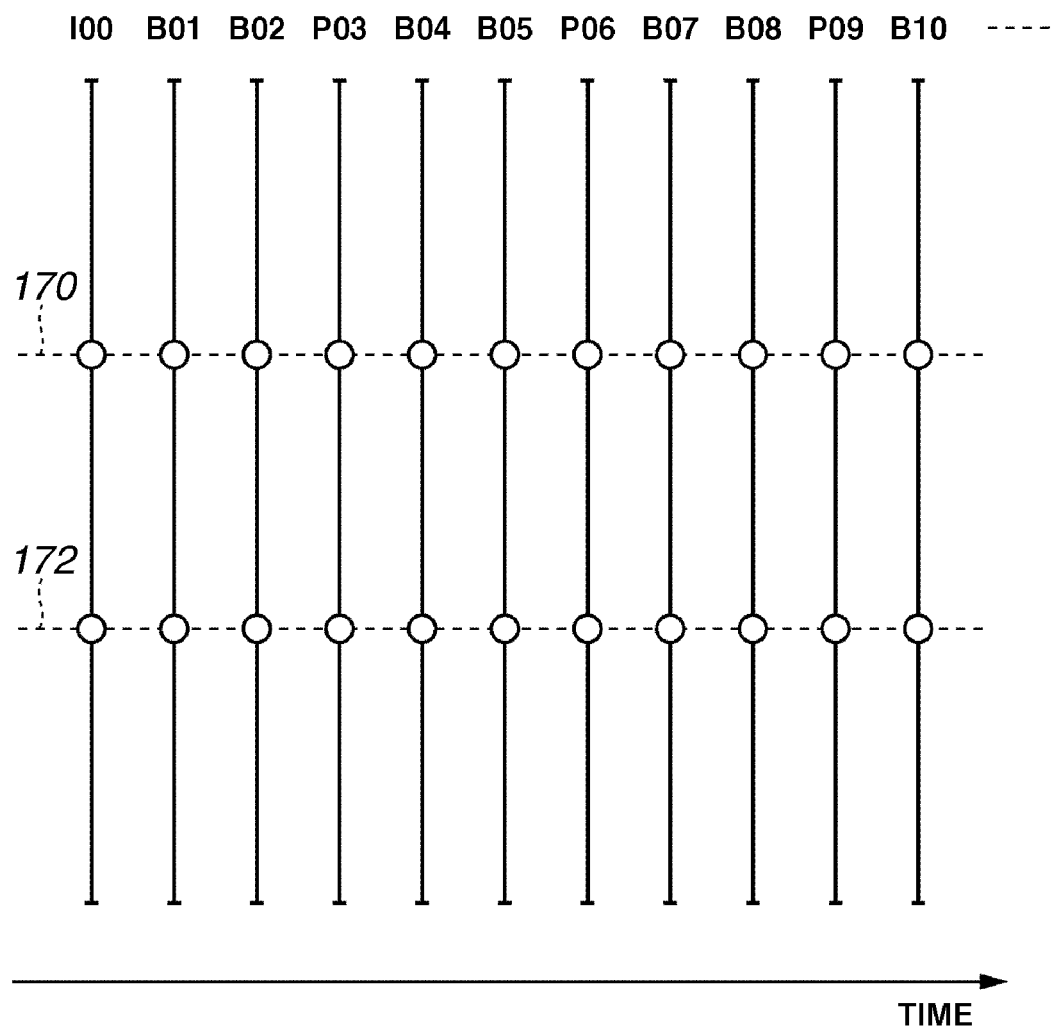

IMAGE CODING APPARATUS AND METHOD

BACKGROUND OF THE INVENTION

1. Field of the Invention

The present invention relates to an image coding apparatus and a method for compression-coding a vide signal. More specifically, the present invention relates to an apparatus and a method for coding a video signal by slice dividing.

2. Description of the Related Art

As a highly efficient compression-coding method for transmitting or accumulating image information, Moving Picture Experts Group (MPEG)-2 and MPEG-4 are known. In addition, MPEG-4 Part-10: AVC (ISO/IEC 14496-10 "Part-10 Advanced Video Coding") is proposed, that is also named H.264. These compression methods achieve a high compression rate utilizing an orthogonal transform such as a discrete cosine transform (DCT), a motion compensation, and inter-picture and intra-picture redundancy.

In H.264, pictures to be coded are classified as an I picture, a P picture, and a B picture, according to a difference in a method of prediction. Each picture includes a plurality of macro-blocks (MBs). Further, H.264 divides one picture into slices including a plurality of macro-blocks to perform coding processing slice by slice. When a picture is slice divided, each slice is called an I slice, a P slice, or a B slice, and so on. In a baseline profile of H.264, a B picture is not used.

An image coding apparatus using H.264 can perform coding per picture (a frame or a field). However, coding can be in some cases more easily performed if a frame or a field is divided into a plurality of slices and the slice is taken as a basic unit for coding.

For example, with respect to an image having a high resolution of 1,920×1,088 pixels, an image coding apparatus divides such high-resolution image into a plurality of slices, and codes and decodes each slice in parallel or in time sharing. By dividing an image into slices to perform coding and decoding in a dispersed manner, an image coding apparatus can efficiently perform coding and decoding.

Japanese Patent Application Laid-Open No. 2005-124041 discusses a method of slice division in which a shape of a slice is changed according to an error in a transmission path, or a motion of an image. Furthermore, Japanese Patent Application Laid-Open No. 2004-235683 discusses the slice division using a coding method devised in the course of standardizing H.264/AVC (this coding method is called H.26L or JVT), which adjusts a code amount to perform slice division.

A slice compliant with H.264 is divided using a data block, namely, a macro-block as a unit for coding processing. That is, a slice includes one or more macro-blocks arranged in a horizontal or vertical direction.

FIG. 17 illustrates a relationship between a slice and a macro-block. Referring to FIG. 17, one picture is horizontally divided into three. That is, one picture includes three slices.

Each slice includes a plurality of macro-blocks. Macro-blocks 152 and 154 are included in a first slice, and are adjacent to a boundary between first and second slices. A macro-block 150 is included in the second slice and is adjacent to the boundary between the first and the second slices.

A slice can take not only a rectangular or strip-like shape illustrated in FIG. 17, but also an arbitrary shape, when a method called a "flexible macro-block order (FMO)" or "slice grouping" is used. Division into slices can be performed in any profile as long as it is performed in the order of rasterization of macro-blocks. However, slice grouping is used only in a baseline profile and an extended profile.

When an image coding apparatus using H.264 utilizes slice division, a slice serves as the basic unit for coding. That is, information about macro-blocks included in another slice cannot be utilized for coding. For example, in FIG. 17, information about the macro-blocks 152 and 154 cannot be utilized for coding the macro-block 150.

As a result, prediction efficiency of intrapicture prediction and interpicture prediction is reduced near the boundary of the slices. Thus, efficiency of coding is reduced.

Context-based Adaptive Binary Arithmetic Coding (CABAC), which is an entropy coding method characteristic of H.264, improves coding efficiency by varying a probability table according to advance of coding processing. The probability table is initialized at the time of start of coding a slice, and thus the probability table becomes different state from a probability distribution that a coding target object has.

This state continues until the coding processing advances to a stage at which the probability table becomes adaptive to the probability distribution of the coding target object. Accordingly, near a slice boundary, which corresponds to a portion immediately after the initialization of the probability table, the coding efficiency is reduced.

As a result of the reduced coding efficiency near the slice boundary, an amount of generated codes increases in macro-blocks located close to the slice boundary. However, in order to control a total amount of codes, the amount of generated codes is restrained.

Accordingly, degradation of image quality occurs in the macro-blocks located close to the slice boundary and the slice boundary becomes visible. In particular, if the horizontally arranged macro-blocks are consecutively degraded, degradation of image quality can be easily recognized as noise.

Here, as illustrated in FIG. 18 and FIG. 19, each of consecutive pictures have slices divided at the same position.

FIG. 18 illustrates an example in which consecutive pictures (00, 01, 02, 03, 04, 05 . . . ) are divided into slices at the same position. FIG. 19 illustrates a division position of the slice when each picture in FIG. 18 is illustrated in cross section.

The symbol "I" added before the number of a picture indicates that the picture is an I picture. In the same way, the symbol "B" indicates a B picture, and the symbol "P" indicates a P picture. For example, "B02" indicates a picture No. 02, which is a B picture.

Referring to FIG. 19, horizontal broken lines 170 and 172, which link slice division positions of each picture indicate that the slice boundary is located at a certain position on a screen. Thus, if the slice boundary is positioned at a certain position on the screen for consecutive plural pictures as described above, noise appearing near the slice boundary can be more easily recognized.

The image degradation occurring near the slice boundary can become less visible if the shape of the slice is changed at random.

However, if the shape of the slice is changed at random, the coding and decoding processing become complicated. For example, the position of each macro-block always needs to be confirmed whether the macro-block is located adjacent to the slice boundary.

SUMMARY OF THE INVENTION

The present invention is directed to an image coding apparatus and method that make image degradation occurring near a slice boundary less visible while bearing less processing load.

According to an aspect of the present invention, an image coding apparatus configured to code a video signal includes: a division unit configured to divide a coding target picture included in an input video signal into a plurality of slices each including one or more data blocks; a coding unit configured to code the video signal in a unit of the slice divided by the division unit; and a setting unit configured to set at least one of a division position of the slice and a number of divisions of the slice to the division unit. The setting unit sets at least one of the division position of the slice and the number of divisions of the slice so that slice boundaries differ from each other between adjacent pictures.

According to another aspect of the present invention, a method for coding a video signal includes: dividing a coding target picture included in an input video signal into a plurality of slices each including one or more data blocks; coding the video signal in a unit of the divided slice; and setting at least one of the division position of the slice and the number of divisions of the slice so that slice boundaries differ from each other between adjacent pictures.

Further features and aspects of the present invention will become apparent from the following detailed description of exemplary embodiments with reference to the attached drawings.

BRIEF DESCRIPTION OF THE DRAWINGS

The accompanying drawings, which are incorporates in and constitute a part of the specification, illustrate exemplary embodiments, features, and aspects of the invention and, together with the description, serve to explain the principle of the invention.

FIG. 19 illustrates a slice division position.

DETAILED DESCRIPTION OF THE EXEMPLARY EMBODIMENTS

Various exemplary embodiments, features and aspects of the present invention will now herein be described in detail with reference to the drawings. It is be noted that the relative arrangement of the components, the numerical expressions, and numerical values set forth in these embodiments are not intended to limit the scope of the present invention unless it is specifically stated otherwise.

First Exemplary Embodiment

A first exemplary embodiment of the present invention will now herein be described.

Figure 1:
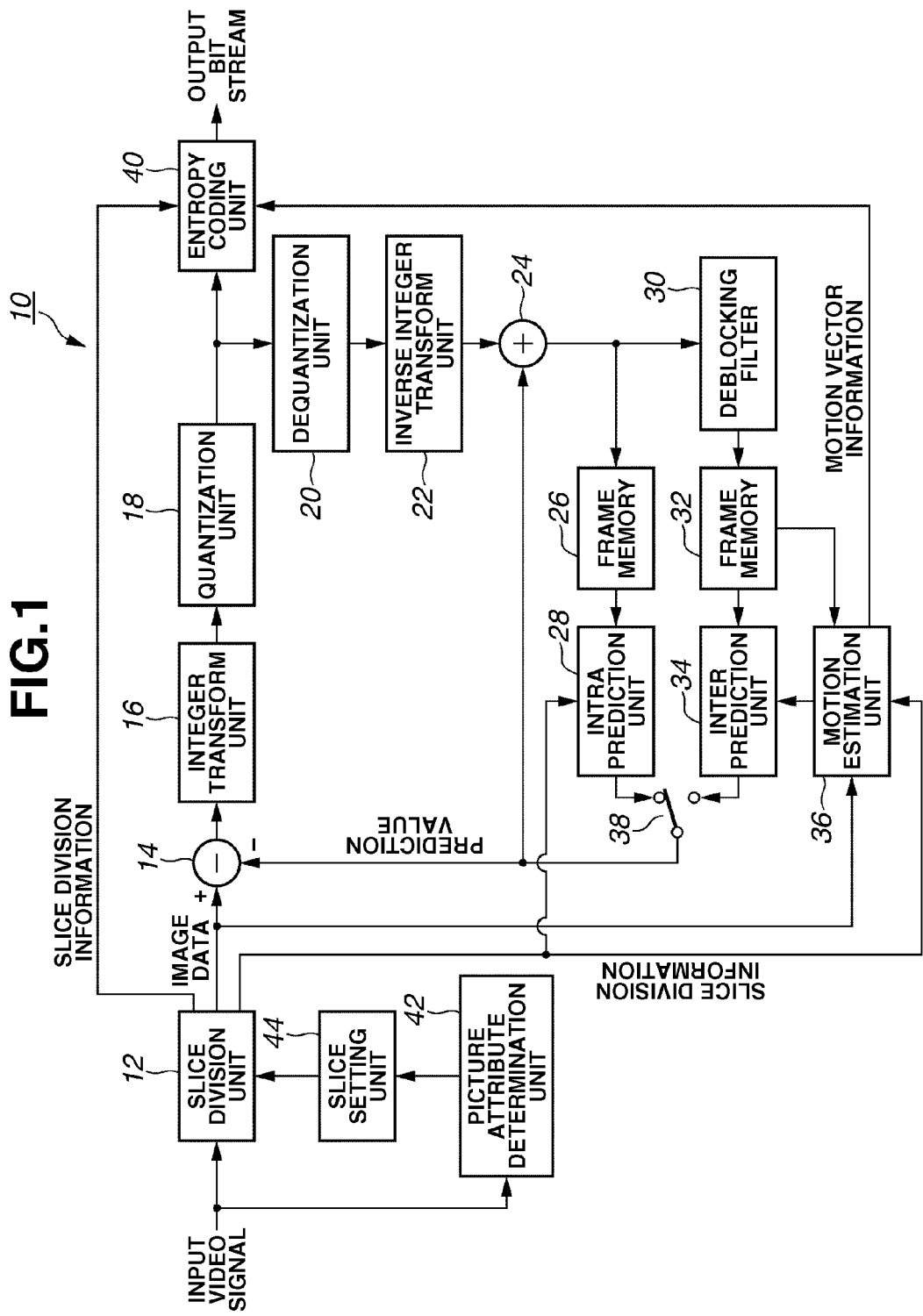
FIG. 1 illustrates a configuration of an image coding apparatus according to an aspect of a first exemplary embodiment of the present invention.

FIG. 1 illustrates a configuration of an image coding apparatus according to a first exemplary embodiment of the present invention. An image coding apparatus 10 encodes a video signal in compliance with MPEG-4 part-10: AVC (ISO/IEC 14496-10: so-called "H.264"). A video signal input to the image coding apparatus 10 is digital data digitized at a predetermined sampling rate. The image coding apparatus 10 can be applied to a digital video camera and a digital video recorder.

A picture attribute determination unit 42 determines an attribute of each picture included in the input video signal. That is, the picture attribute determination unit 42 determines whether each picture should be coded into an I picture, a P picture, or a B picture. In performing slice division, the picture attribute determination unit 42 determines an attribute of each slice.

A slice setting unit 44 determines a position of a boundary in performing slice division, and a type of coding for each slice (I slice, B slice, P slice, and so on) based on the determination by the picture attribute determination unit 42, and sets the result of the determination to a slice division unit 12. A method of determining slice division will be described below. A slice includes a data block, namely, a macro-block that is used as a unit for coding processing.

The slice division unit 12 divides each picture of an input video signal (a frame or a field) into slices based on setting information received from the slice setting unit 44. That is, the slice division unit 12 identifies and outputs slice-by-slice image data constituting each picture of an input video signal. The slice division unit 12 supplies slice division information, which indicates a position of a slice-divided macro-block and a coding type of a slice, to an intra prediction unit 28, a motion estimation unit 36, and an entropy coding unit 40. Hereinbelow, a coding target picture is described, using a frame as an example.

A subtracter 14, when utilizing prediction coding, computes a difference between image data received from the slice division unit 12 and a prediction value received from a switch 38. Subsequently, the subtracter 14 outputs the difference data to an integer transform unit 16, which performs discrete cosine transform (DCT) of integer accuracy. The subtracter 14, when not utilizing prediction coding, outputs the image data received from the slice division unit 12 to the integer transform unit 16 as it is.

The integer transform unit 16 performs discrete cosine transform on the image data received from the subtracter 14 at an integer accuracy in the unit of 4×4 pixel blocks, and outputs a resulting DCT coefficient to a quantization unit 18.

The quantization unit 18 performs quantization on the DCT coefficient received from the integer transform unit 16 and outputs a resulting quantization transform coefficient to the entropy coding unit 40 and a dequantization unit 20.

The entropy coding unit 40 entropy codes the quantization transform coefficient received from the quantization unit 18. For the entropy coding, H.264 can selectively use Context-Based Adaptive Variable Length (CAVLC) and Context-Based Adaptive Binary Arithmetic Coding (CABAC).

The entropy coding unit 40 performs coding using a slice as a basic unit, based on the input slice division information, using the CABAC, for example. The entropy coding unit 40 multiplexes motion vector information received from the motion estimation unit 36 into coded data and outputs the coded data as an output bit stream.

In the output bit stream, information about a position of the slice-divided macro-block and a coding type of a slice are also multiplexed.

The dequantization unit 20 turns the quantization transform coefficient received from the quantization unit 18 back into the DCT coefficient and transmits the DCT coefficient to an inverse integer transform unit 22. The inverse integer transform unit 22 performs inverse integer transform processing on the DCT transform coefficient received from the dequantization unit 20 and decodes data equivalent to output data from the subtracter 14.

An adder 24, when not utilizing prediction coding, outputs output data from the inverse integer transform unit 22 as it is. On the other hand, when utilizing prediction coding, the adder 24 adds a prediction value received from the switch 38 to the output data from the inverse integer transform unit 22 and outputs the resulting data.

Output data from the adder 24 is so-called locally decoded data. The output from the adder 24 is stored in a frame memory 26 for intraframe prediction.

Furthermore, the output from the adder 24 is stored in a frame memory 32 for interframe prediction, via a deblocking filter 30. The deblocking filter 30 is used for reducing a block noise in locally decoded data.

The motion estimation unit 36 compares image data received from the slice division unit 12 with the locally decoded data stored in the frame memory 32 to estimate motion of an object in an image. The locally decoded data stored in the frame memory 32 constitutes a frame positioned before or after a display timing of a current frame, and is utilized as a reference image for interframe prediction.

A motion vector detected by the motion estimation unit 36 is supplied to an inter prediction unit 34 and the entropy coding unit 40. The motion estimation unit 36 inhibits detection of a motion vector traversing a boundary of slices, based on the input slice division information.

The intra-prediction unit 28 refers to the locally decoded data stored in the frame memory 26, and computes and outputs an intraframe prediction value. The intra prediction unit 28, when image data is divided into slices, computes a prediction value using only intraframe and intraslice information, based on the input slice division information.

In intra prediction compliant to H.264, information about mutually adjacent pixels included in a coded image block is used to generate a prediction value for a block to be predicted.

The inter prediction unit 34, according to the motion vector estimated by the motion estimation unit 36, determines image data used for prediction, from among reference images stored in the frame memory 32. The inter prediction unit 34 computes and outputs an interframe prediction value (a so-called motion compensation prediction value).

The switch 38, depending on whether image data to be coded is coded by intra prediction or inter prediction, selects prediction values from the intra prediction unit 28 or the inter prediction unit 34, and supplies the selected prediction value to the subtracter 14 as a prediction value for prediction coding.

When the slice coding type is an I slice, intraframe coding can be used. When the slice coding type is a P slice, intraframe coding and interframe coding using one reference image can be used. When the slice coding type is a B slice, intraframe coding and interframe coding using one or two reference images can be used.

Now, an operation for slice division according to the present exemplary embodiment is described below with reference to FIG. 2 and FIG. 3.

Figure 2:
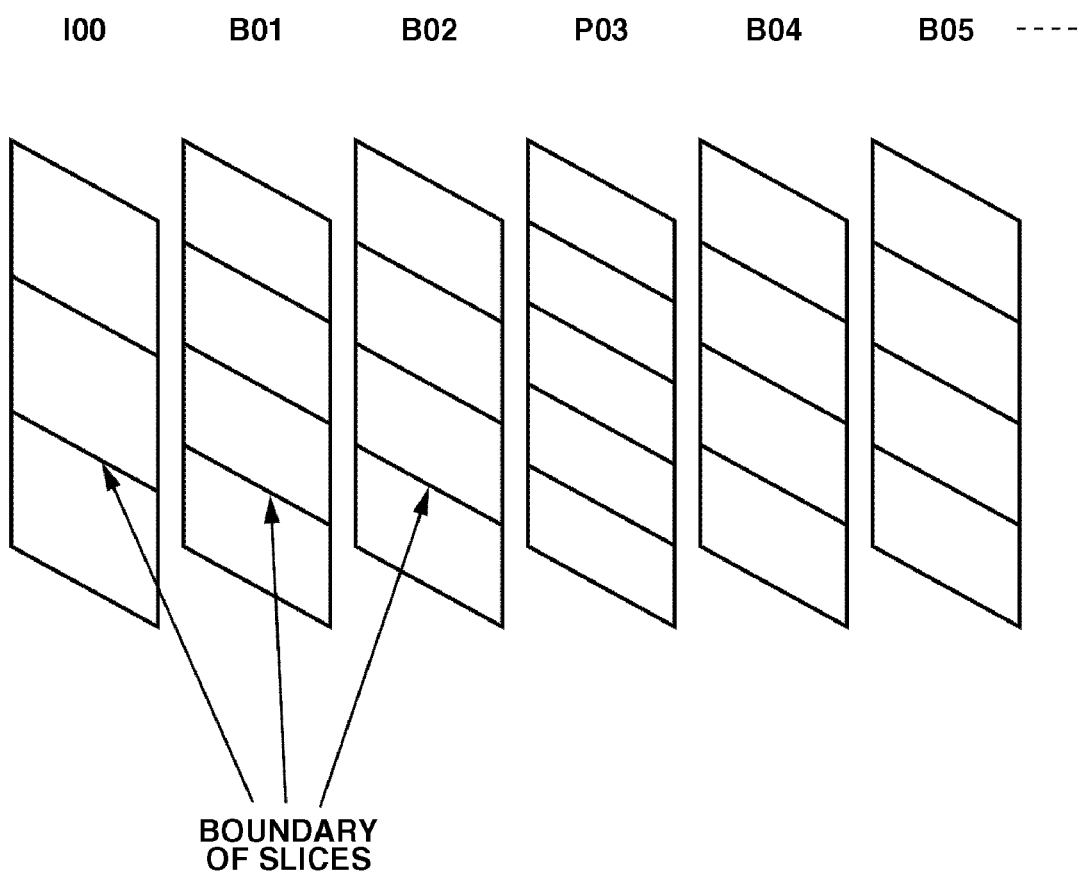
FIG. 2 illustrates slice division according to the first exemplary embodiment of the present invention.
Figure 3:
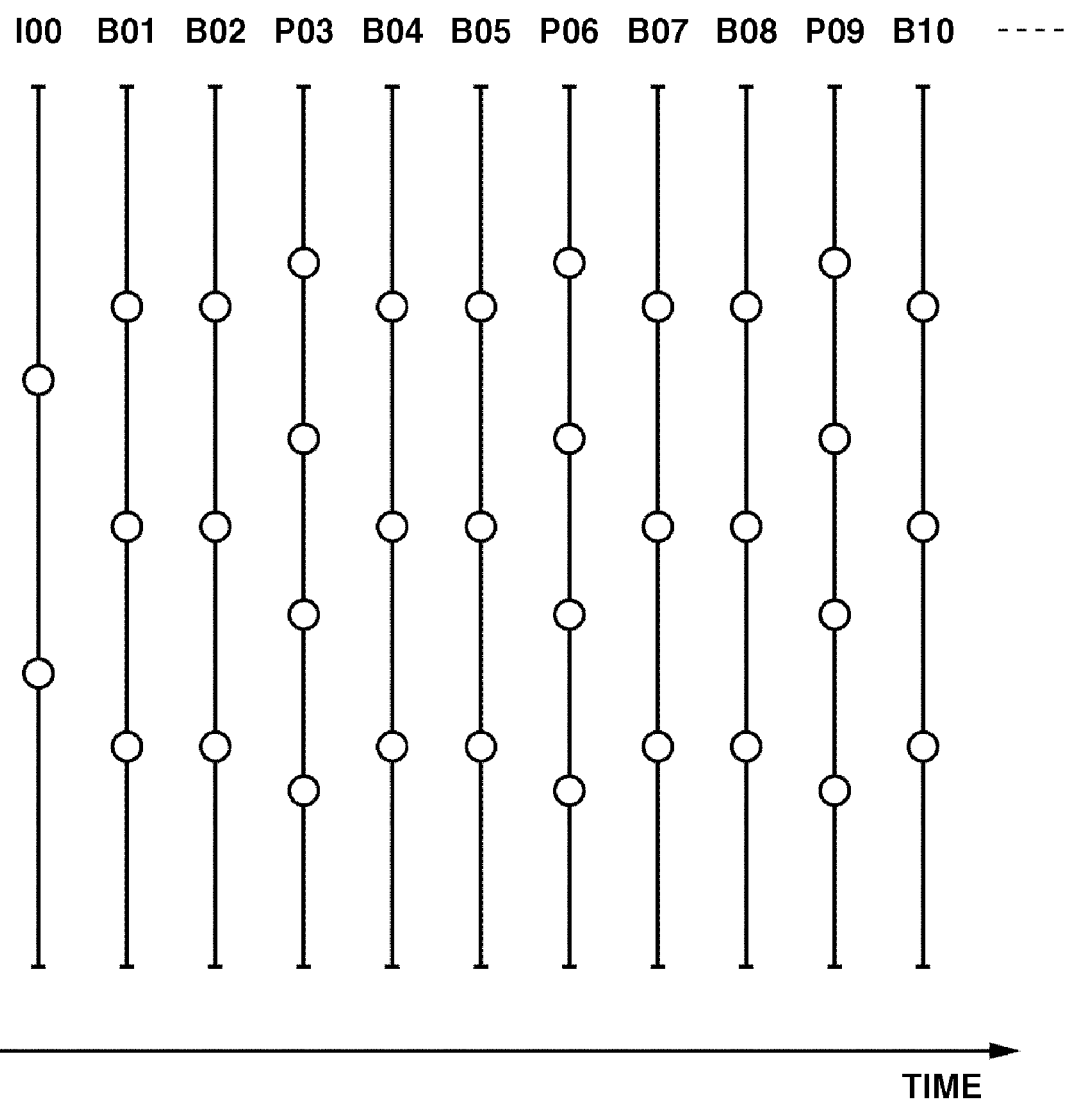
FIG. 3 illustrates a slice division position according to the first exemplary embodiment of the present invention.

FIG. 2 shows that consecutive pictures (00, 01, 02, 03, 04, 05 . . . ) are divided into slices at a different boundary position according to an attribute of a picture. FIG. 3 illustrates a slice division position indicated in a cross section of each picture in FIG. 2.

Slice division is performed according to the order of rasterization of macro-blocks. As a result, a horizontal rectangular slices (three I frames, four B frames, and five P frames) are generated as shown in the example illustrated in FIG. 2.

The picture attribute determination unit 42, according to a predetermined coding method, determines which of I, P, and B frames is coded in the input video signal. Then, the picture attribute determination unit 42 notifies a determined picture attribute to the slice setting unit 44. The slice setting unit 44 sets the slice division unit 12 so that an I frame is equally divided, for example, into three slices.

The slice setting unit 44 sets the slice division unit 12 so that a P frame is equally divided, for example, into five slices. The slice setting unit 44 sets the slice division unit 12 so that a B frame is equally divided, for example, into four slices.

The slice division unit 12, based on the setting by the slice setting unit 44, divides each frame in the input video signal into the set number of slices. The operation after the slice division is performed as described above.

In the present exemplary embodiment, as described above, the number of divided slices and the division position are regularly changed according to the picture attribute. Thus, the slice division position is not placed at the same position for a long time. Accordingly, image degradation occurring near the slice boundary becomes less visible. In FIGS. 2 and 3, two consecutive B frames (e.g., frame 01 and frame 02) are divided into slices at the same positions. However, compared with an I frame and a P frame, image degradation of a B frame is not visible at the slice boundary.

In FIG. 2, the frame is equally divided into slices with respect to an I frame, a P frame, and a B frame. However, if a B frame exists without fail between the I frame and the P frame, a sufficient effect can be obtained even if the same methods of slice division are used for the I frame and the P frame.

As described above, by using regular slice division position, it is easy to determine a slice division position during decoding. Thus, decoding processing can be simplified.

Second Exemplary Embodiment

Figure 4:
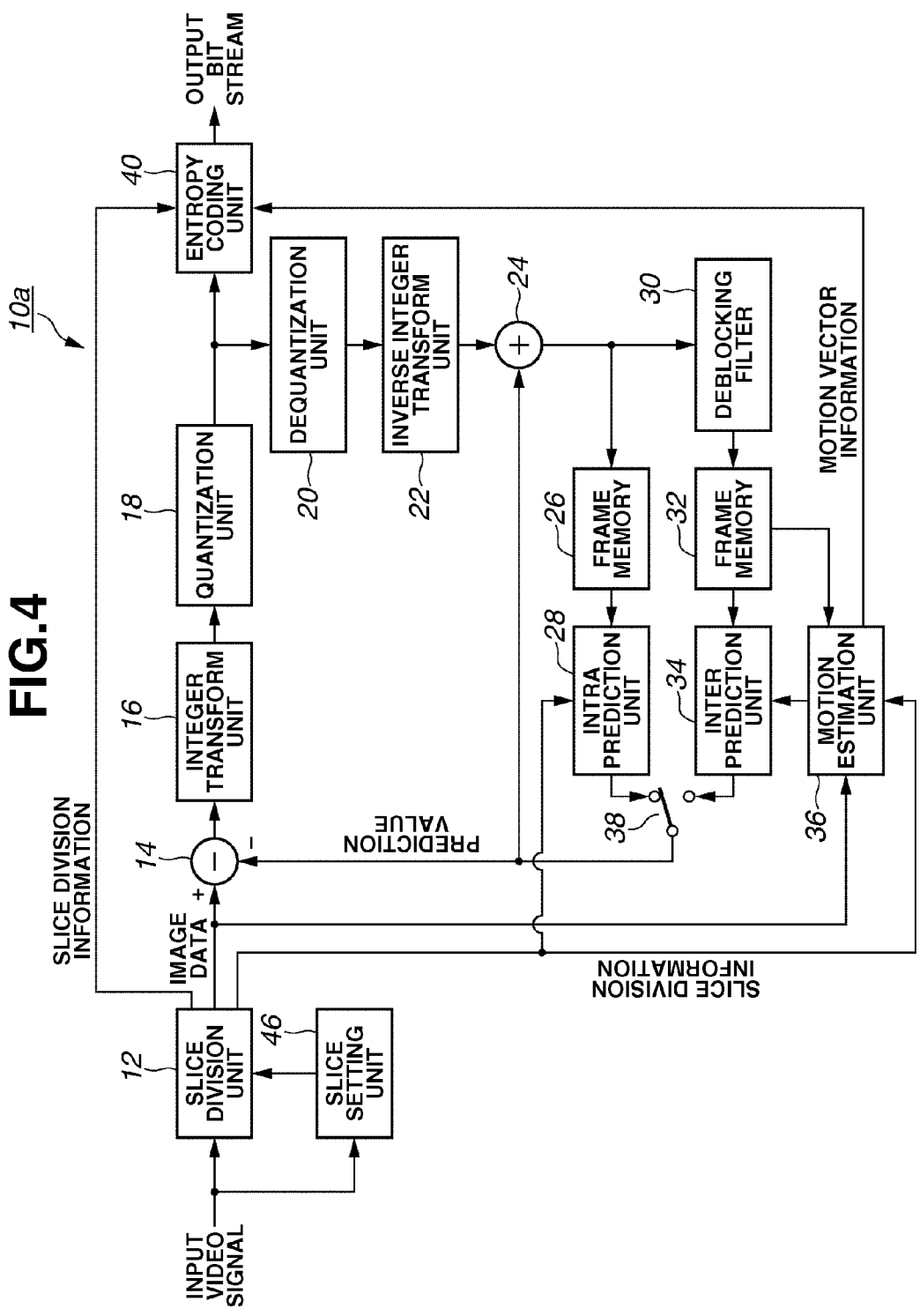
FIG. 4 illustrates a configuration of an image coding apparatus according to a second exemplary embodiment of the present invention.

In the first exemplary embodiment, the number of divided slices and the division position are regularly changed according to the picture attribute. In a second exemplary embodiment, the number of divided slices and the division position are changed in the order of picture number (namely, a frame number). FIG. 4 illustrates a configuration of an image coding apparatus according to the second exemplary embodiment. The portions and units similar to those illustrated in FIG. 1 are provided with the same numerals and symbols, and the description thereof is not repeated here.

An image coding apparatus 10a illustrated in FIG. 4 includes a slice setting unit 46. The slice setting unit 46 counts the number of frames in the input video signal. The slice setting unit 46, according to the counted value, sets a slice division condition to the slice division unit 12 as described below.

For example, in the case where the three types of slice division method are used, a picture number of the coding target frame is divided by three, and determines whether the frame should be divided into three, four, or five, depending on a remainder thereof.

Figure 5:
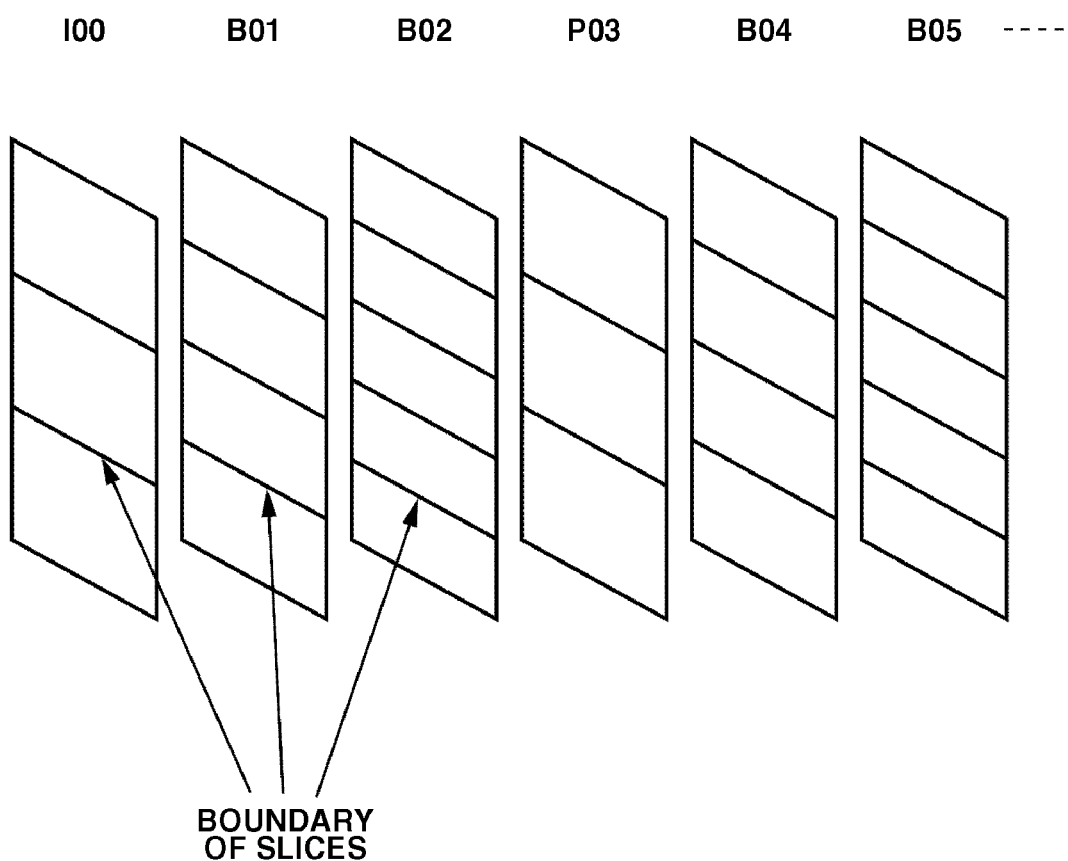
FIG. 5 illustrates slice division according to the second exemplary embodiment of the present invention.
Figure 6:
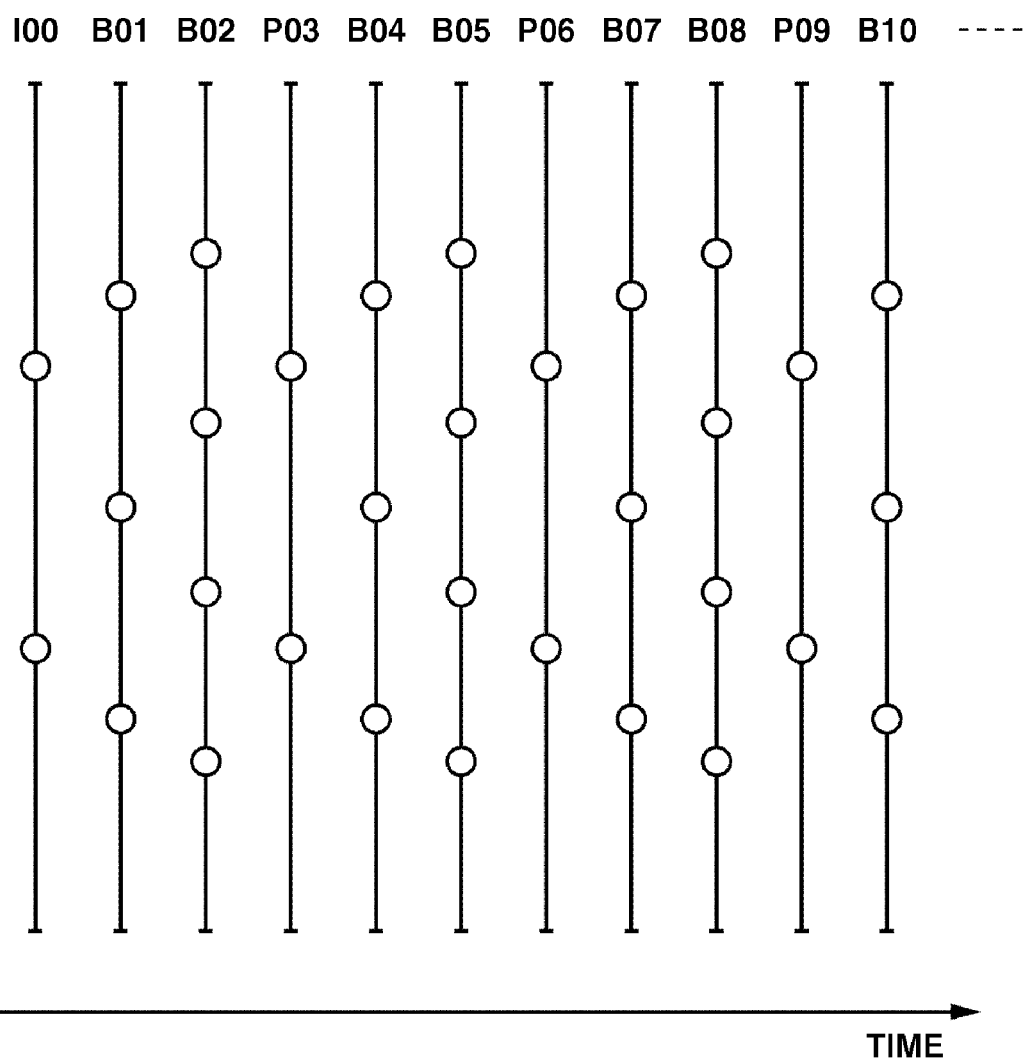
FIG. 6 illustrates a slice division position according to the second exemplary embodiment of the present invention.

In FIG. 5, consecutive pictures (00, 01, 02, 03, 04, 05 . . . ) are divided into slices at different boundary positions according to the picture number. FIG. 6 illustrates the slice division positions of each picture in FIG. 5 in a cross section.

The slice division is performed according to the order of rasterization of macro-blocks. As a result, a horizontal rectangular slices are generated as shown in FIG. 5.

In FIG. 5 and FIG. 6, in the case of a picture whose picture number is exactly divisible by 3 (I00, P03, P06, P09 . . . ), division into three slices, for example, is set.

In the case of a picture whose picture number is divisible by 3 with remainder 1 (B01, B04, B07, B10 . . . ), division into four slices, for example, is set. In the case of a picture whose picture number is divisible by 3 with remainder 2 (B02, B05, B08, B11 . . . ), division into five slices, for example, is set.

In FIG. 5 and FIG. 6, the slice division is repeated in a period of three pictures.

The slice division unit 12 divides each frame of the input video signal into the number of slices set by the slice setting unit 46. The operation after the slice division is described above.

In the present exemplary embodiment, as described above, the number of division into slices and the division position are regularly changed according to the picture number. Thus, the slice division position is not the same between adjacent pictures. Accordingly, image degradation occurring near the slice boundary becomes less visible.

Third Exemplary Embodiment

In a third exemplary embodiment, the number of division into slices and the division position can be changed by a method different from the second exemplary embodiment, under a predetermined rule. In the description of the third exemplary embodiment, the block diagram in FIG. 4 is used to illustrate a configuration of an image coding apparatus according to the third exemplary embodiment.

Figure 7:
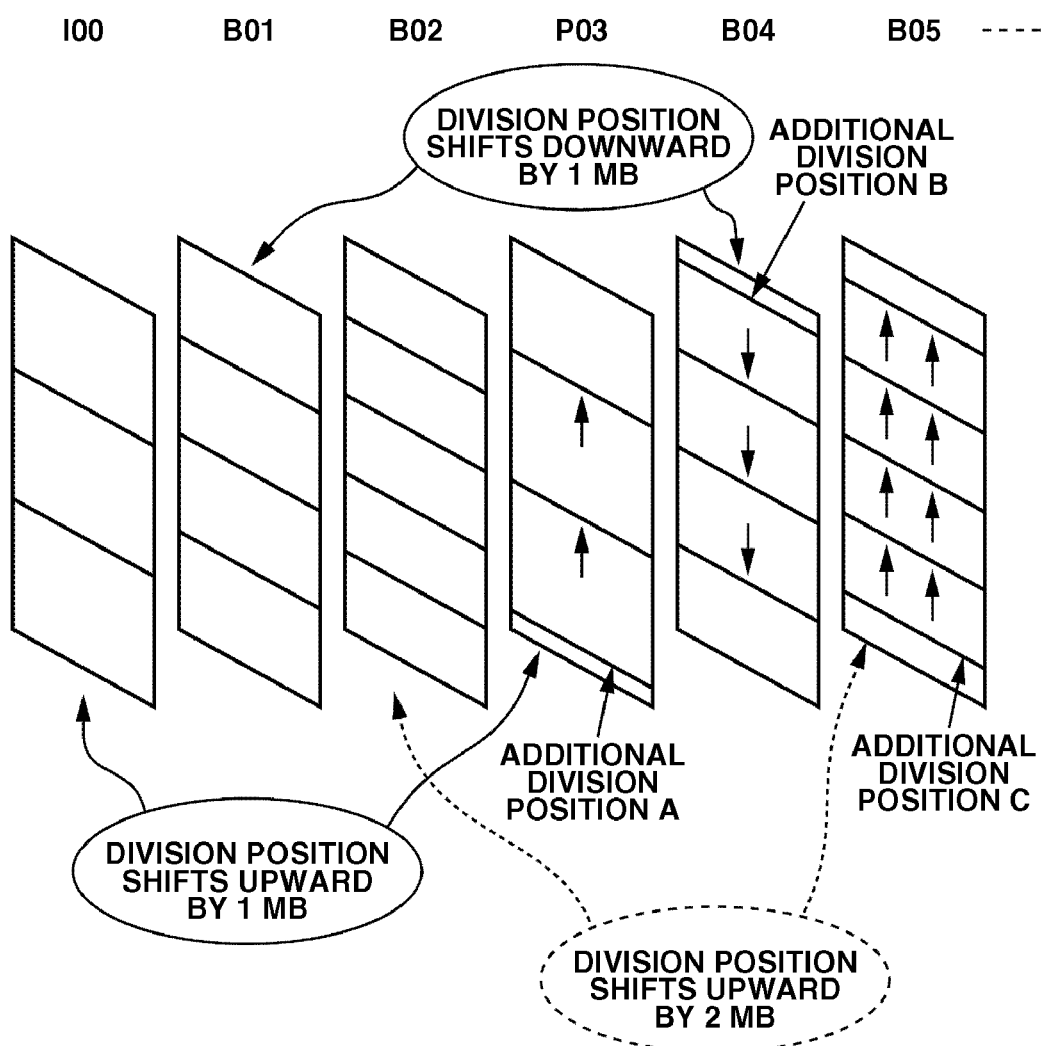
FIG. 7 illustrates slice division according to a third exemplary embodiment of the present invention.
Figure 8:
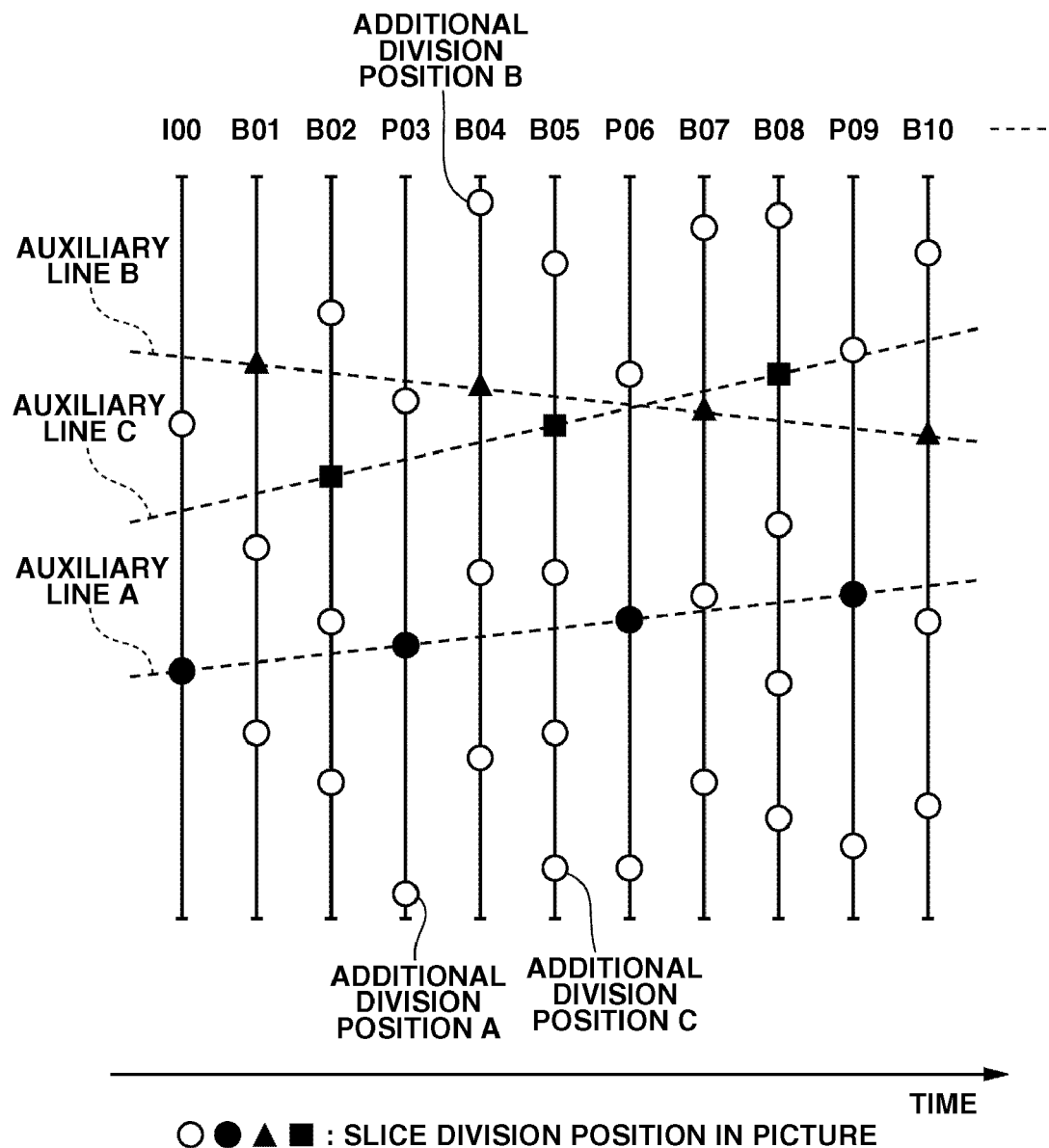
FIG. 8 illustrates a slice division position according to the third exemplary embodiment of the present invention.

In FIG. 7, consecutive pictures (00, 01, 02, 03, 04, 05 . . . ) are divided into slices at different boundary positions according to picture numbers thereof. FIG. 8 illustrates the slice division positions in a cross section of each picture in FIG. 7.

Referring to FIG. 8, unfilled circles, filled circles, filled triangles, and filled rectangles indicate slice division positions. An auxiliary line A represents a change of the slice division position indicated with filled circle, with respect to a group of pictures whose numbers are exactly divisible by 3 (I00, P03, P06, P09 . . . ) (first group).

An auxiliary line B represents a change of the slice division position indicated with a filled triangle, with respect to a group of pictures whose numbers are divisible by 3 with remainder 1 (B01, B04, B07, B10 . . . ) (second group). An auxiliary line C represents a change of the slice division position indicated with a filled rectangle, with respect to a group of pictures whose numbers are divisible by 3 with remainder 2 (B02, B05, B08, B11 . . . ) (third group).

As can be easily known from FIG. 7, the slice division position of the pictures included in the first group, shifts upward in the screen per picture by a predetermined amount, for example, 1 macro-block (MB). The slice division position of the pictures included in the second group, shifts downward in the screen per picture by a predetermined amount, for example, 1 macro-block (MB). The slice division position of the pictures included in the third group, shifts upward in the screen per picture by a predetermined amount, for example, 2 macro-blocks (MB).

A new division line is added to a slice whose size becomes large due to movement of its slice division positions, as illustrated in FIG. 7 as a new division positions A, B, and C.

In the present exemplary embodiment, the number of divided slices is changed and the division position is shifted according to the picture number of a picture. Accordingly, probability that adjacent plural pictures have the same slice division position is lowered. Thus, image degradation occurring near the boundary between slices becomes far less visible. In the case of image reproduction for search, only the above-described first group can be displayed. If the present invention is applied to such case, image degradation on the slice division boundary becomes less visible.

In the present exemplary embodiment, it is assumed that a picture is equally divided into slices. However, the same effect can be obtained by unequally dividing a picture, as long as the slice division position differs between adjacent pictures.

In the present exemplary embodiment, the slice division condition is determined according to the picture number. However, the slice division condition can be changed depending on a prediction method.

Figure 9:
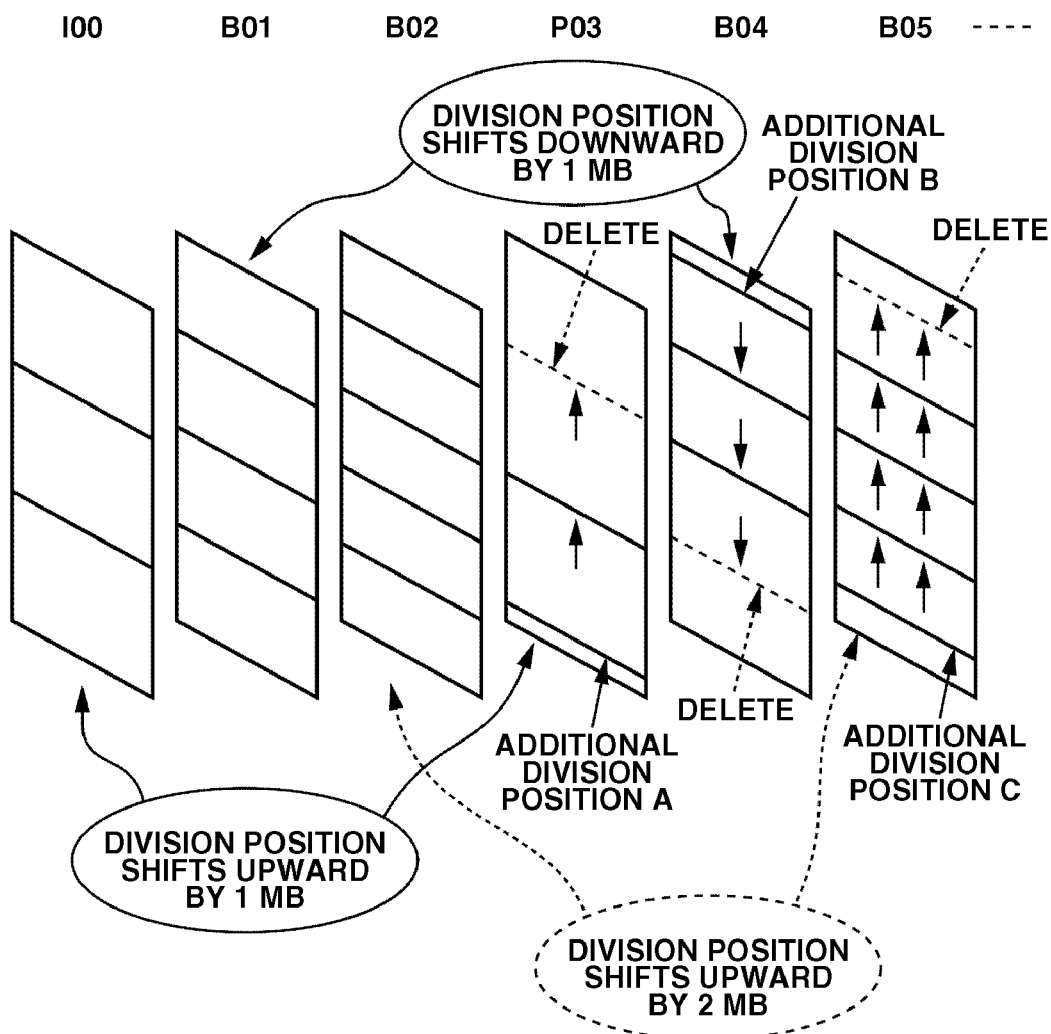
FIG. 9 illustrates slice division according to a modification of the third exemplary embodiment of the present invention.
Figure 10:
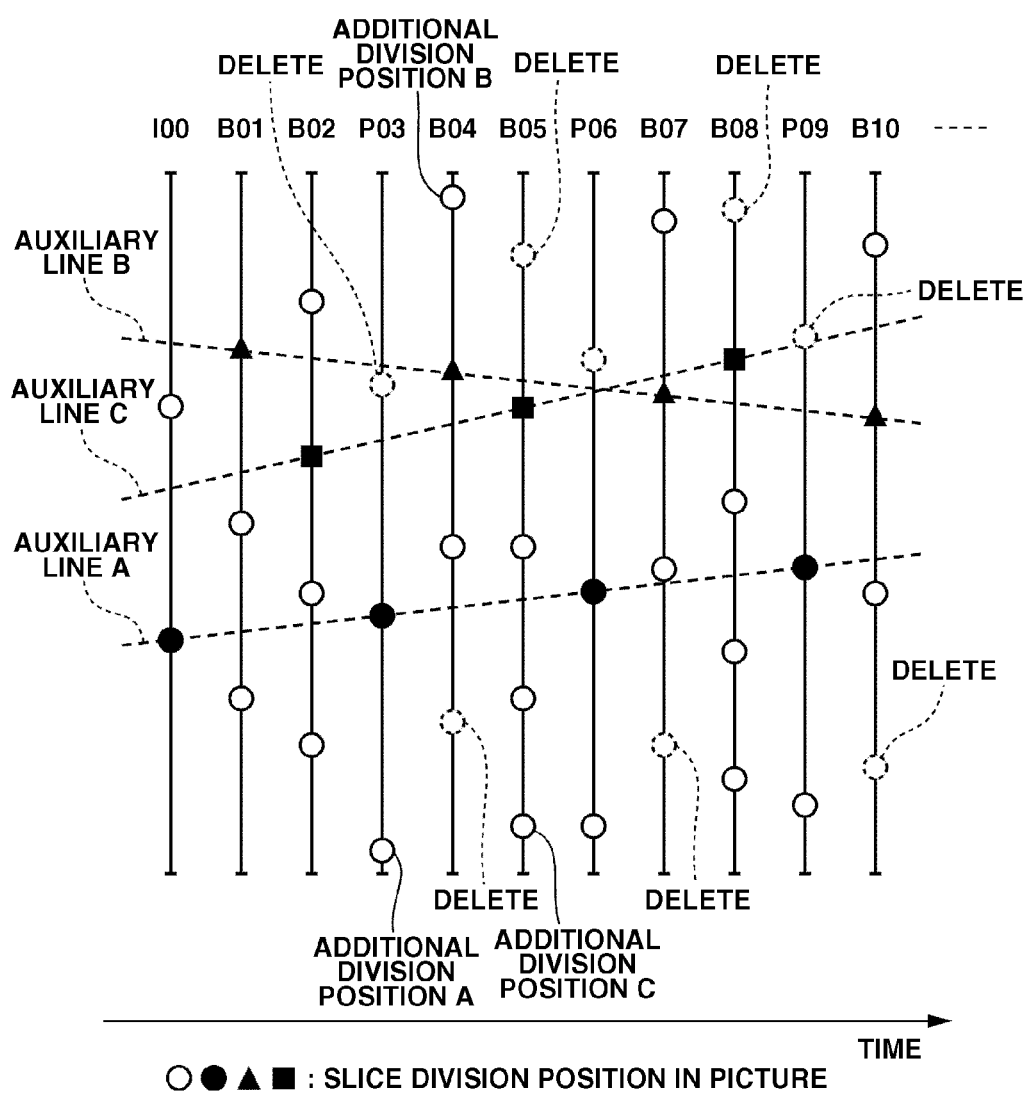
FIG. 10 illustrates a slice division position according to a modification of the third exemplary embodiment of the present invention.

Further, as a modification of the present exemplary embodiment, in order to maintain a number of divisions per group, an existing boundary can be deleted when a slice boundary is added, as illustrated in FIG. 9 and FIG. 10.

FIG. 9 illustrates slice division where such a modification is applied to the third exemplary embodiment. FIG. 10 illustrates a slice division position in a cross section of each picture in FIG. 9. A boundary to be deleted, is indicated by comparing FIGS. 9 and 10 with FIGS. 7 and 8, respectively.

In the above-described exemplary embodiments, the basic slice division number is a combination of three, four, and five. However, the present invention is not limited to these slice division numbers. Furthermore, in the third exemplary embodiment, a picture is classified into three groups. However, a picture can be classified into four or more groups.

Figure 11:
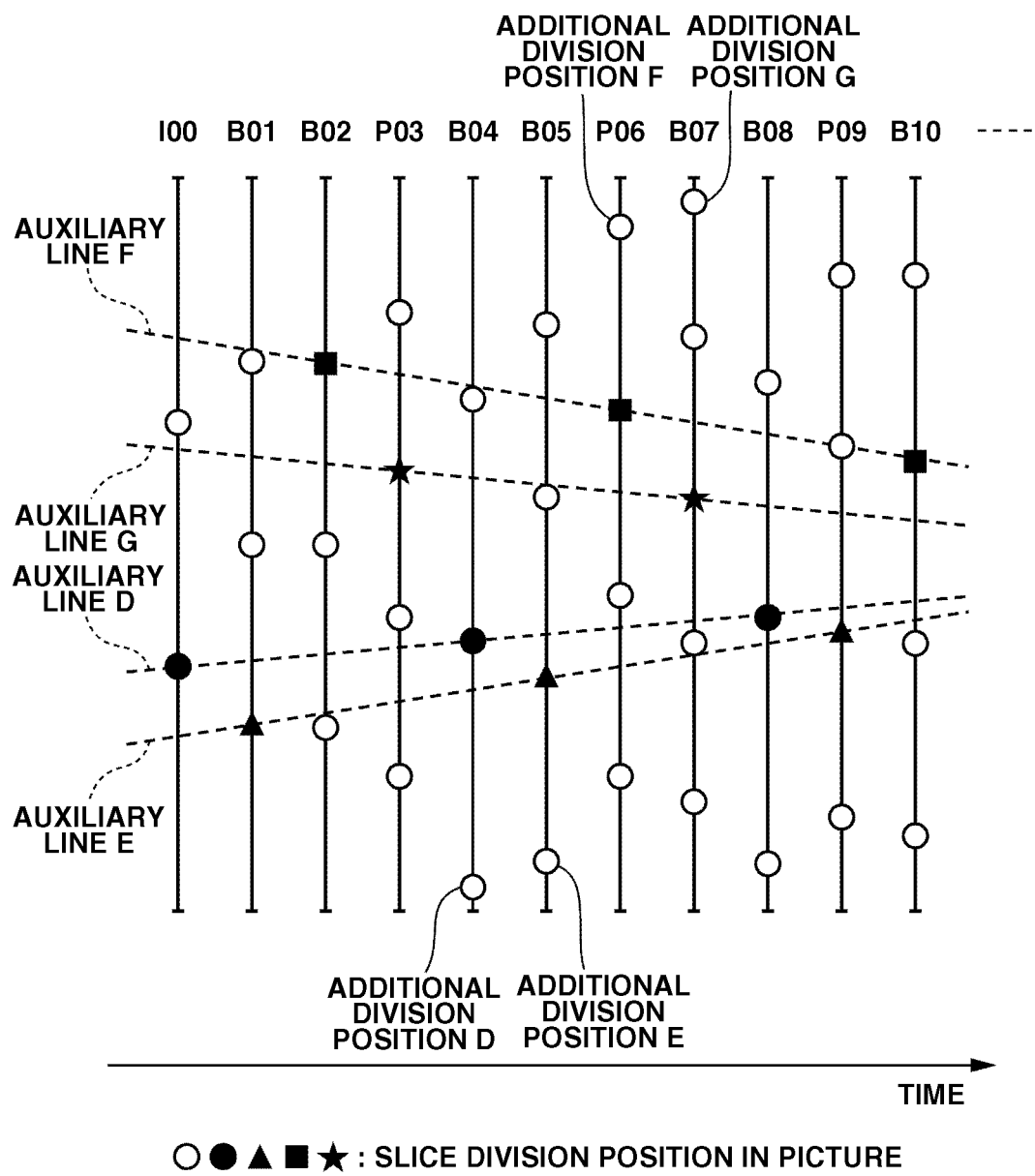
FIG. 11 illustrates a slice division position according to an expansion 1 of the third exemplary embodiment of the present invention.

FIG. 11 illustrates a slice division position in the case where the division method illustrated in FIG. 7 and FIG. 8 is expanded to four groups (expansion 1).

Referring to FIG. 11, unfilled circles, filled circles, filled triangles, filled rectangles, and filled pentangles indicate a slice division position. An auxiliary line D represents a change in the slice division position indicated with a filled circle, with respect to a group of pictures whose number is divisible by 4 (I00, B04, B08 . . . ) (first group). An auxiliary line E represents a change in the slice division position indicated with a filled triangle, with respect to a group of pictures whose number is divisible by 4 with remainder 1 (B01, B05, P09 . . . ) (second group). An auxiliary line F represents a change in the slice division position indicated with a filled rectangle, with respect to a group of pictures whose number is divisible by 4 with remainder 2 (B02, P06, B10 . . . ) (third group). An auxiliary line G represents a change in the slice division position indicated with a filled pentangle, with respect to a group of pictures whose number is divisible by 4 with remainder 3 (P03, B07, B11 . . . ) (fourth group).

In FIG. 11, the slice division position of the pictures included in the first group, shifts upward in the screen per picture by a predetermined amount, for example, an amount equivalent to one macro-block (MB).

Furthermore, the slice division position of the pictures included in the second group, shifts upward in the screen per picture by a predetermined amount, for example, an amount equivalent to two macro-blocks (MBs). The slice division position of the pictures included in the third group, shifts downward in the screen per picture, by a predetermined amount, for example, an amount equivalent to two macro-blocks (MBs). The slice division position of the pictures included in the fourth group, shifts downward in the screen per picture by a predetermined amount, for example, an amount equivalent to one macro-block (MB).

Figure 12:
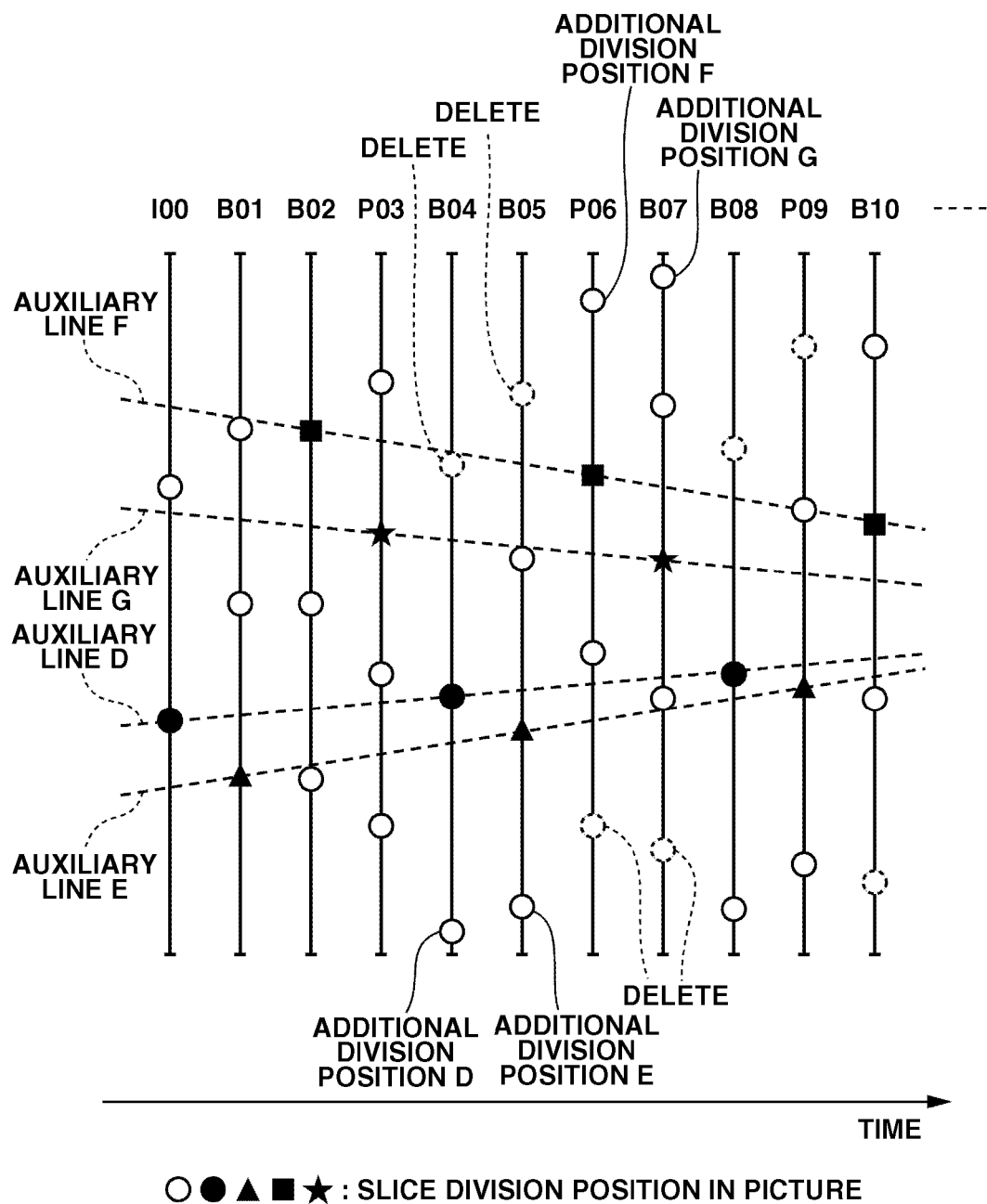
FIG. 12 illustrates a slice division position according to an expansion 2 of the third exemplary embodiment of the present invention.

FIG. 12 illustrates a slice division position in the case where the division method illustrated in FIG. 9 and FIG. 10 is expanded to four groups (expansion 2). A boundary to be deleted, is indicated by comparing FIG. 12 with FIG. 11.

Fourth Exemplary Embodiment

In the first through the third exemplary embodiment, the number of divisions is different between pictures. In a fourth exemplary embodiment, slice division positions (boundaries between slices) between adjacent pictures are different from each other. In the fourth exemplary embodiment, the number of slice divisions in pictures are equal to each other and only the division position is changed between the pictures. In the fourth exemplary embodiment, the block diagram in FIG. 4 is used as the diagram indicating a configuration of an image coding apparatus according to the fourth exemplary embodiment.

Figure 13:
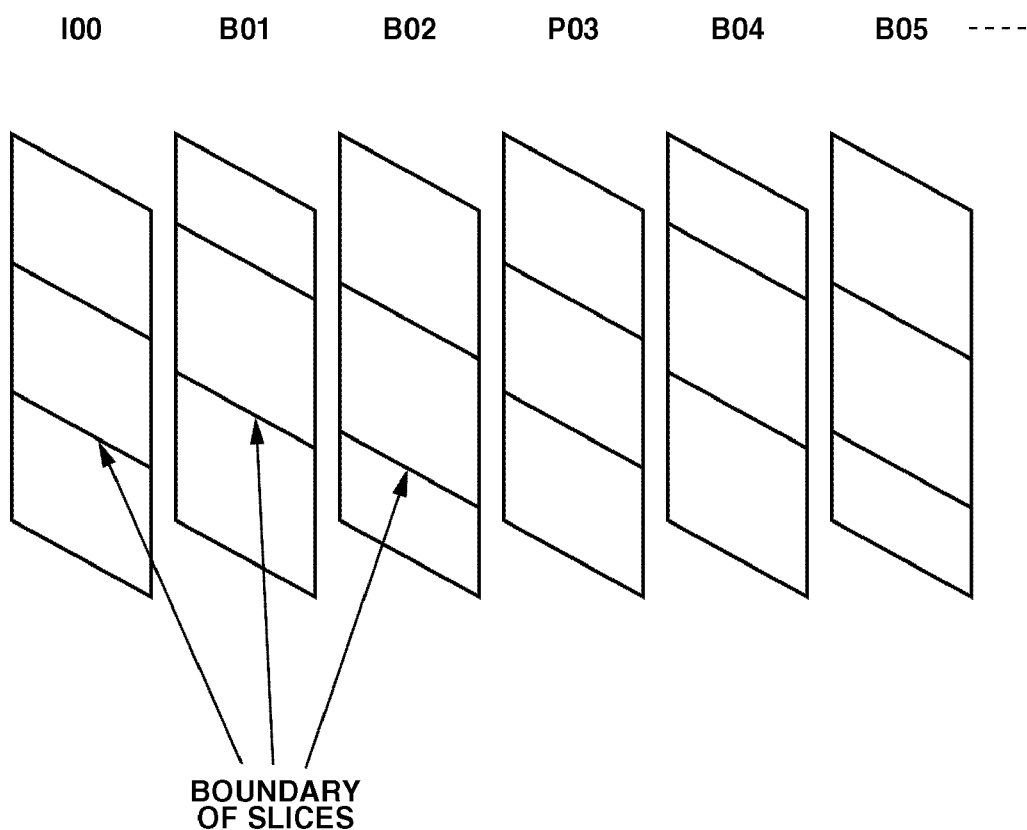
FIG. 13 illustrates slice division according to a fourth exemplary embodiment of the present invention.
Figure 14:
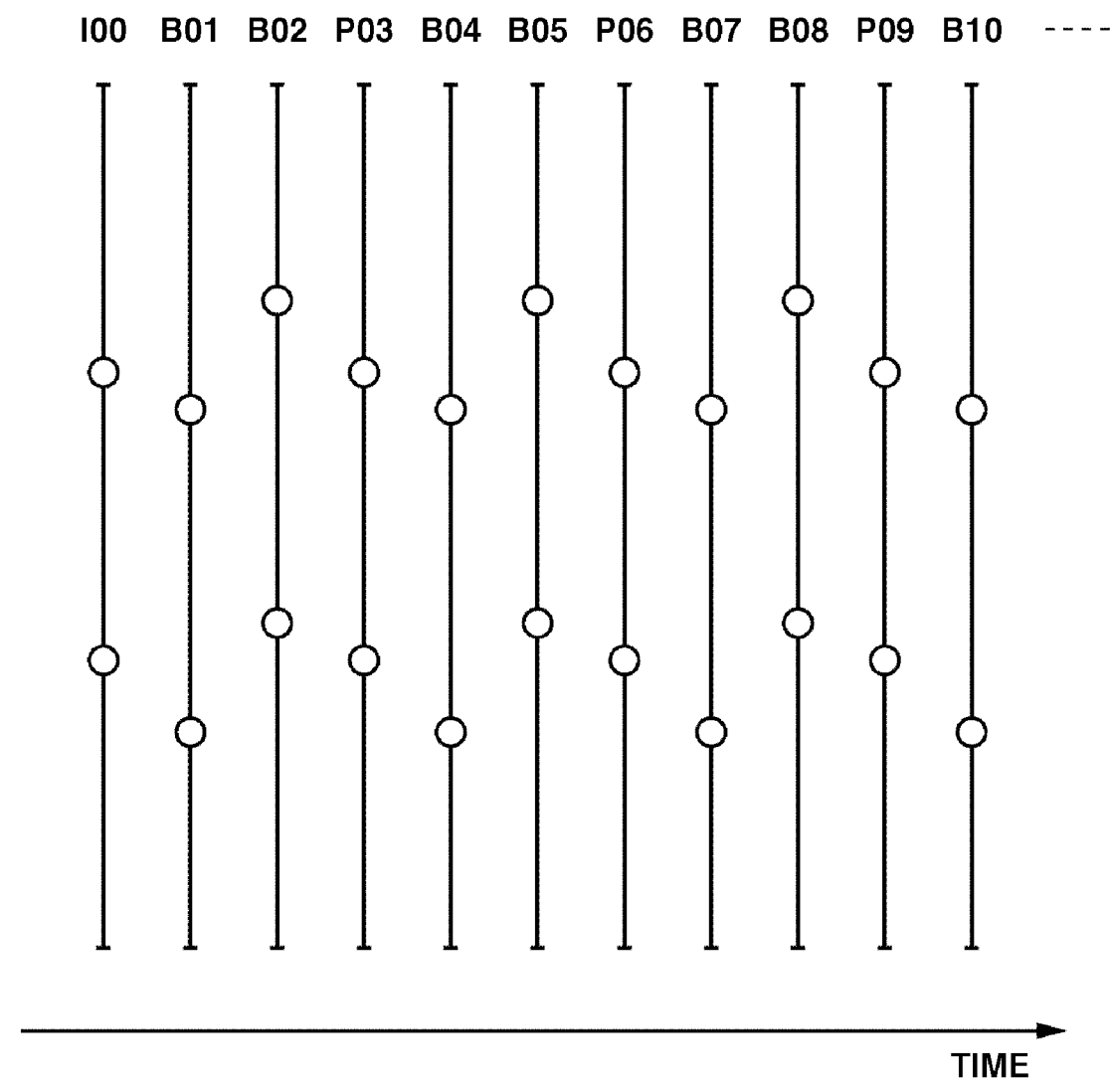
FIG. 14 illustrates slice division position according to the fourth exemplary embodiment of the present invention.

FIG. 13 shows that consecutive pictures (00, 01, 02, 03, 04, 05 . . . ) are each divided into the same number of slices at different positions. FIG. 14 illustrates a slice division position when each picture in FIG. 13 is illustrated in cross section.

In the example illustrated in FIG. 13 and FIG. 14, all the pictures are divided into three slices. In this case, as illustrated in FIG. 14, the slice division position in each of the pictures is set to differ from each other between adjacent pictures so that the slice division boundary cannot successively appear at the same position.

In this case, the change in the slice division position does not need to be completely random. The change in the slice division positions can be set in a regular pattern repeated in a predetermined period. The position change is set to be repeated in a predetermined period so that the slice division position can be easily determined at the time of decoding. Thus, decoding processing can be simplified.

In the example illustrated in FIG. 13 and FIG. 14, the same slice division position is repeated in the period of three pictures. However, the present invention is not limited to this period, but a longer period can be set.

Fifth Exemplary Embodiment

In the H.264 method, the prediction method can be set differently per slice. That is, an I slice, a P slice, or a B slice can be set per divided slice. For example, one part of the slices in the B picture can be coded as an I slice. In this case, error tolerance and display reproduction at the time of high speed reproduction can be improved in the area where the slices are converted into I slices.

Figure 15:
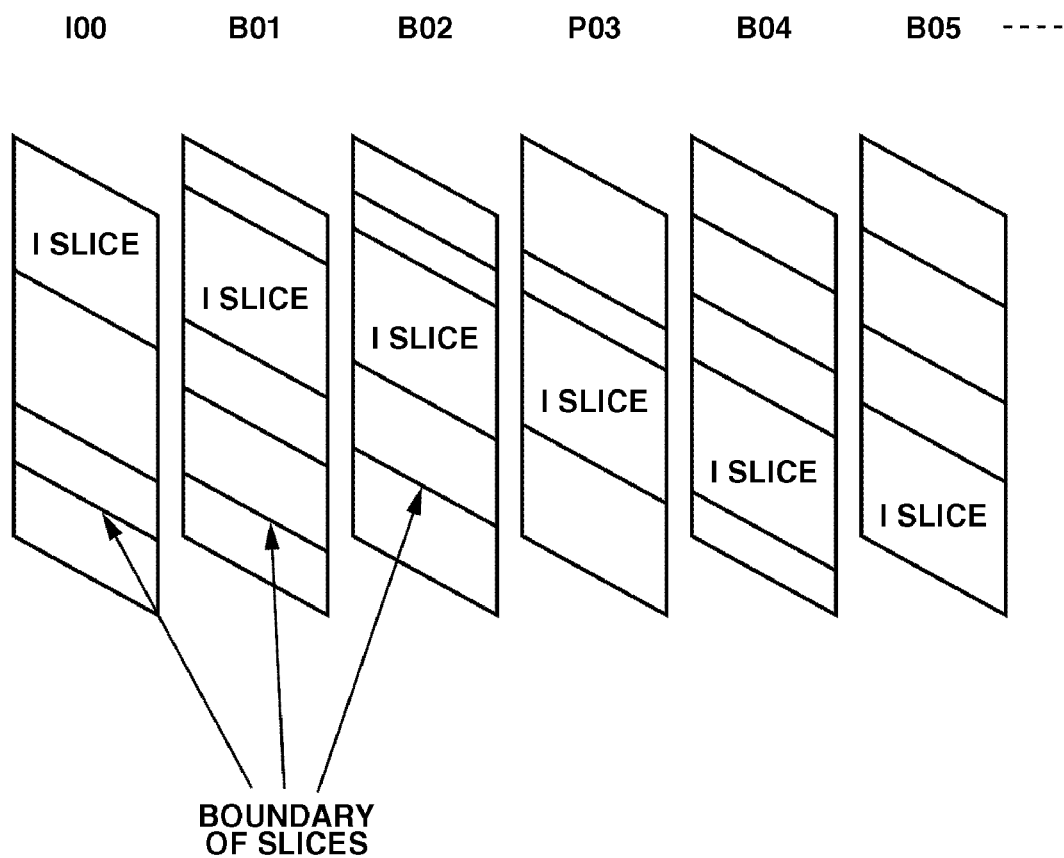
FIG. 15 illustrates slice division according to a fifth exemplary embodiment of the present invention.
Figure 16:
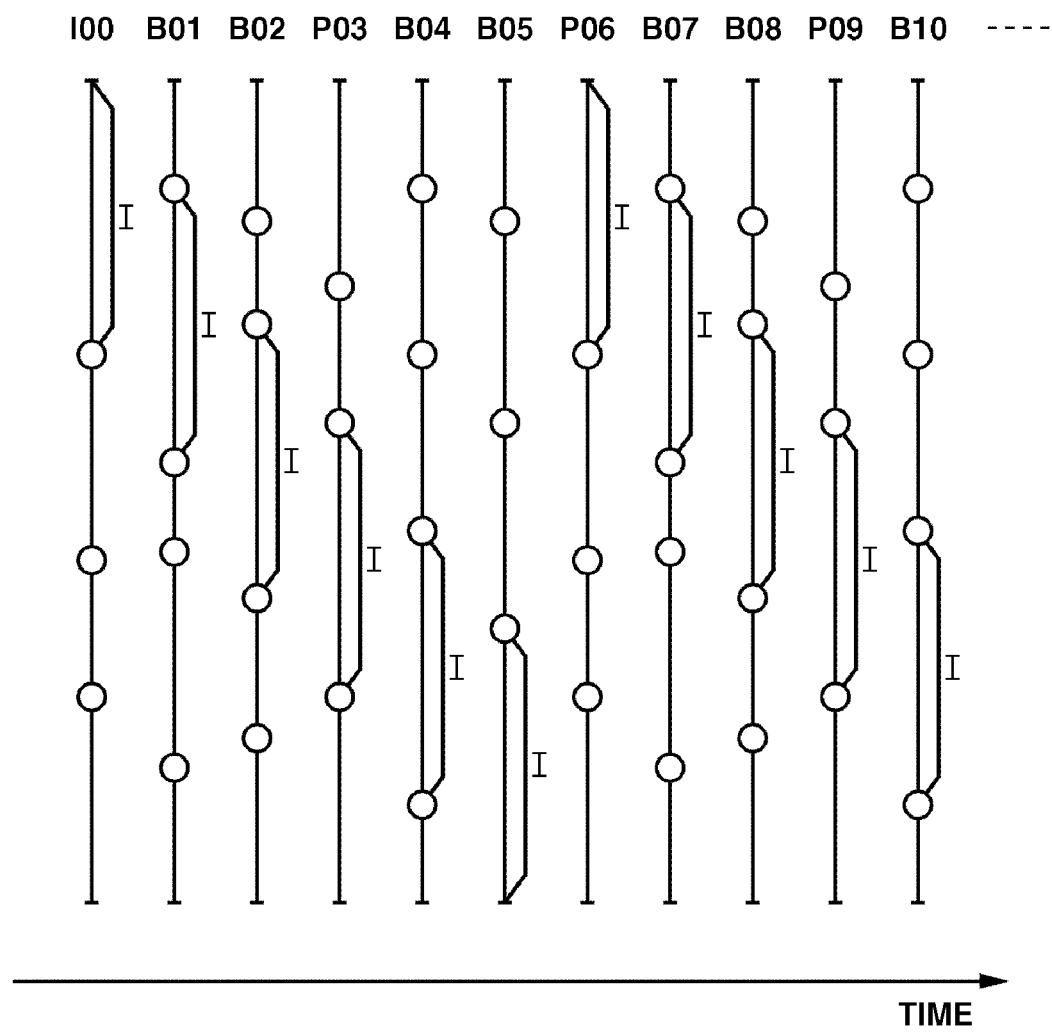
FIG. 16 illustrates a slice division position and an I slice position according to the fifth exemplary embodiment of the present invention.
Figure 17:
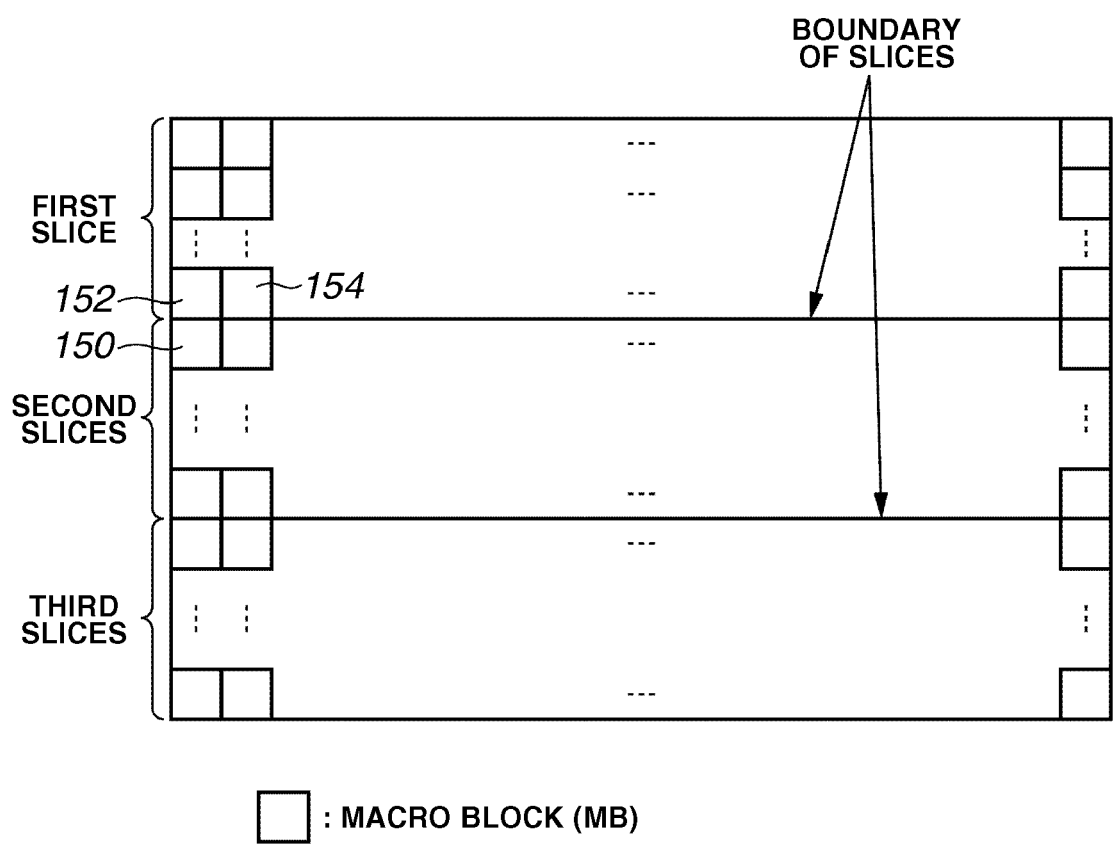
FIG. 17 illustrates a relationship between a slice and a macro-block.
Figure 18:
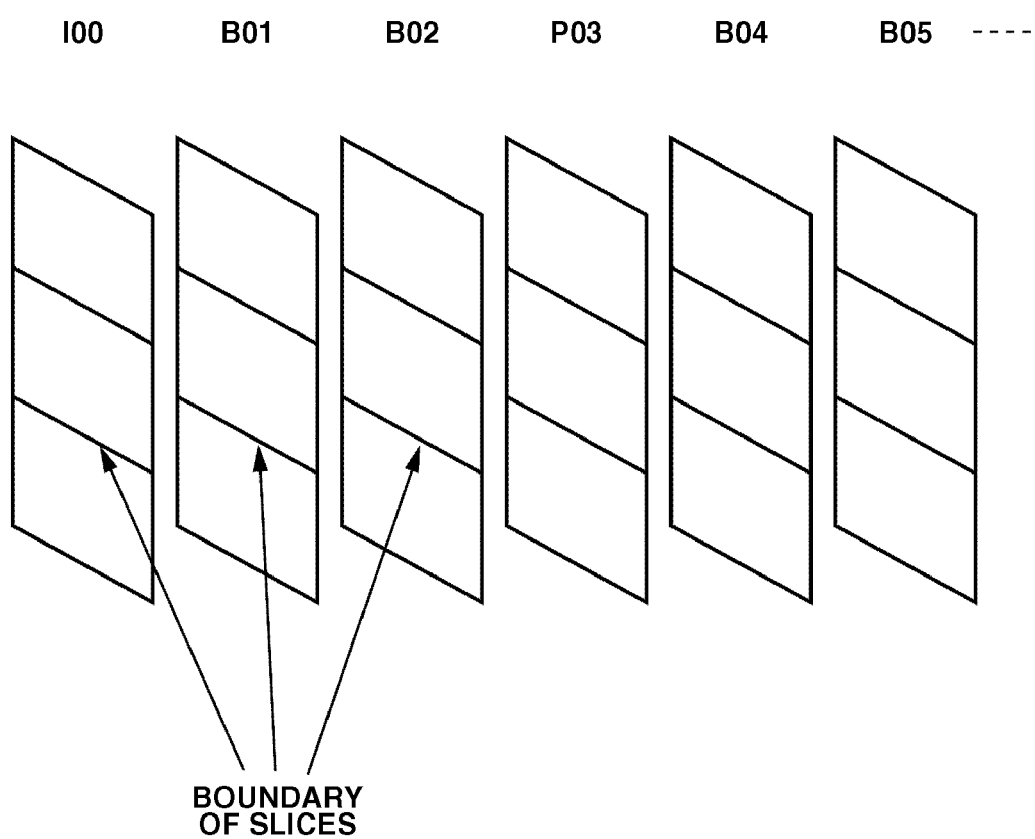
FIG. 18 illustrates an example of slice division.

In a fifth exemplary embodiment, a function of converting one part of the slices into I slices is applied to the present invention. The block diagram in FIG. 4 is used as a diagram illustrating a configuration of an image coding apparatus according to the fifth exemplary embodiment. FIG. 15 shows that consecutive pictures (00, 01, 02, 03, 04, 05 . . . ) are divided into slices. Further, FIG. 15 shows that one part of the slices is set as I slices. FIG. 16 illustrates a slice division position and a position of the I slice when each picture in FIG. 15 is illustrated in cross section.

As illustrated in FIG. 15 and FIG. 16, in the present exemplary embodiment, each of the picture is set so that the slice division position differs according to adjacent pictures and one part of the slices of each picture is set and coded to be an I slice. I slices are set, for example, for a first slice in the I00 picture, a second slice in the B01 picture, a third slice in the B02 picture, and a third slice in the P03 picture (Note here that the other slices in the I00 picture are I slices. However, these slices are not illustrated in FIG. 15 because they are unnecessary in describing the present exemplary embodiment. Hereafter, when an "I slice" is simply referred to, the other I slices in the I00 picture are not included.)

Each slice to be an I slice is shifted little by little and set at different positions per picture. The division position is set at the position different from the slice division position of an adjacent picture. Further, the division positions of the other slices are also set at the position different from the division position of an adjacent picture.

Generally, an I slice can use only intra prediction as a prediction mode. Accordingly, the coding efficiency is low and noise is likely to occur, although it depends on the amount of allocated codes. Particularly, in the case where an adjacent slice is a P slice and a B slice, which can be efficiently coded, the degree of degradation in the I slice is noticeable. Thus, the boundary between slices can be easily recognized.

Accordingly, in the present exemplary embodiment, the slice division position of each picture is placed at a position different from that of an adjacent picture just as in the case of the above-described embodiments, and moreover I slices are set to shift per picture. Thus, the boundary between slices becomes less visible. Further, the error tolerance in the area set as an I slice, and the display reproduction at the time of high speed reproduction can be improved.

As described above, in the present invention, the slice division positions are set to be different from each other between adjacent pictures, or high probability that the slice division positions differ from each other, is achieved.

In the present invention, the slice division positions are regularly changed, and accordingly, the slice division position can be easily determined at the time of decoding. Thus, decoding can be more easily processed.

Other Exemplary Embodiments

Each unit constituting the image coding apparatus, and each steps constituting the image coding method according to the above-described exemplary embodiments of the present invention can be implemented by an operation of a program stored in a random access memory (RAM) and a read-only memory (ROM) of a computer.

Moreover, the present invention can be implemented as a system, an apparatus, a method, a program, or a storage medium. More specifically, the present invention can be applied to a system including a plurality of devices or to an apparatus that includes one device.

Further, the present invention can be implemented by directly or remotely supplying a program (software) implementing functions of the above-described exemplary embodiments to a system or an apparatus and reading and executing supplied program code, with the system or a computer of the apparatus.

Accordingly, the program code itself, which is installed on the computer for implementing the functional processing of the present invention with the computer, implements the present invention.

In such a case, the program can be configured in any form, such as object code, a program executed by an interpreter, and script data supplied to an operating system (OS).

As the recording medium for supplying such program code, a floppy disk, a hard disk, an optical disk, a magneto-optical disk (MO), a CD-ROM, a CD-R, a CD-RW, a magnetic tape, a nonvolatile memory card, a ROM, and a DVD (a DVD-ROM and a DVD-R) can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk.

The functions of the above embodiments can also be implemented by dividing the program code into a plurality of files and downloading each divided file from different web sites. That is, a WWW server can allow a plurality of users to download the program file(s) for implementing the functional processing.

In addition, the above program can also be supplied by distributing a storage medium such as a CD-ROM and the like which stores the program according to the present invention after an encryption thereof by allowing the user satisfying a prescribed condition to download key information and decode the encryption from the web site via the Internet, and by executing and installing in the computer the encrypted program code using the key information.

In addition, the functions according to the embodiments described above can be implemented not only by executing the program code read by the computer, but also implemented by an OS or the like which carries out a part of or the whole of the actual processing based on an instruction given by the program code.

Further, in another aspect of the embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-124007 filed Apr. 27, 2006 and No. 2007-042661 filed Feb. 22, 2007, which are hereby incorporated by reference herein in their entirety.

What is claimed is:

1. An image coding apparatus configured to code a video signal, the image coding apparatus comprising:
a division unit configured to divide a coding target picture included in an input video signal into a plurality of slices each including one or more data blocks;
a coding unit configured to code the video signal in a unit of the slice divided by the division unit; and
a setting unit configured to set at least one of a division position of the slice and a number of divisions of the slice, to the division unit, wherein
the setting unit sets at least one of the division position of the slice and the number of divisions of the slice so that slice boundaries differ from each other between adjacent pictures.

2. The image coding apparatus according to claim 1, wherein the setting unit sets at least one of the division position of the slice and the number of divisions of the slice based on an attribute of the picture.

3. The image coding apparatus according to claim 1, wherein the setting unit sets at least one of the division position of the slice and the number of divisions of the slice based on a picture number of the picture.

4. The image coding apparatus according to claim 1, wherein the coding unit performs prediction coding restricted by the slice.

5. The image coding apparatus according to claim 1, wherein the division unit supplies information about slice division to the coding unit.

6. The image coding apparatus according to claim 5, wherein the coding unit includes an entropy coding unit configured to perform coding in the unit of the slice based on the information about the slice division.

7. The image coding apparatus according to claim 5, wherein the coding unit includes a motion estimation unit configured to perform motion estimation related to interpicture prediction in the unit of the slice based on the information about the slice division.

8. The image coding apparatus according to claim 5, wherein the coding unit includes an intrapicture prediction unit configured to perform prediction processing in the unit of the slice based on the information about the slice division.

9. The image coding apparatus according to claim 1, wherein the setting unit sets a coding type per slice to be set.

10. The image coding apparatus according to claim 1, wherein the setting unit sets a part of the slices to be slices on which only intra prediction within the slice can be performed.

11. An image coding apparatus configured to code a video signal, the image coding apparatus comprising:
a division unit configured to divide a coding target picture included in an input video signal into a plurality of slices each including one or more data blocks;
a coding unit configured to code the video signal in a unit of the slice divided by the division unit; and
a setting unit configured to set at least one of a division position of the slice and a number of divisions of the slice, to the division unit, wherein
the setting unit sets at least one of the division position of the slice and the number of divisions of the slice so that the division positions of the plurality of slices periodically change based on a predetermined number of pictures.

12. An image coding apparatus configured to code a video signal, the image coding apparatus comprising:
a division unit configured to divide a coding target picture included in an input video signal into a plurality of slices each including one or more data blocks;

a coding unit configured to code the video signal in a unit of the slice divided by the division unit; and a setting unit configured to set at least one of a division position of the slice and a number of divisions of the slice, to the division unit, wherein the setting unit causes at least one of the division position of the slice and the number of divisions of the slice to regularly change based on a predetermined number of pictures.

13. A method for coding a video signal, the method comprising:

dividing a coding target picture included in an input video signal into a plurality of slices each including one or more data blocks;

coding the video signal in a unit of the divided slice; and setting at least one of the division position of the slice and the number of divisions of the slice so that slice boundaries differ from each other between adjacent pictures.

14. The method according to claim 13 further comprising setting at least one of the division position of the slice and the number of divisions of the slice based on an attribute of the picture.

15. The method according to claim 13, further comprising setting at least one of the division position of the slice and the number of divisions of the slice based on a picture number of the picture.

16. The method according to claim 13, further comprising performing prediction coding restricted by the slice.

17. The method according to claim 13, further comprising using information about slice division in the coding processing.

18. The method according to claim 17, further comprising performing entropy coding in the unit of the slice based on the information about the slice division.

19. The method according to claim 17, further comprising performing motion estimation related to interpicture prediction in the unit of the slice based on the information about the slice division.

20. The method according to claim 17, further comprising performing intrapicture prediction in the unit of the slice based on the information about the slice division.

21. The method according to claim 13, further comprising setting a coding type per slice to be set.

22. The method according to claim 13, further comprising setting a part of the slices to be slices on which only intra prediction within the slice can be performed.

23. A method for coding a video signal, the method comprising:

dividing a coding target picture included in an input video signal into a plurality of slices each including one or more data blocks;

coding the video signal in a unit of the divided slice; and setting at least one of the division position of the slice and the number of divisions of the slice so that the division positions of the plurality of slices periodically change based on a predetermined number of pictures.

24. A method for coding a video signal, the method comprising:

dividing a coding target picture included in an input video signal into a plurality of slices each including one or more data blocks;

coding the video signal in a unit of the divided slice; and causing at least one of the division position of the slice and the number of divisions of the slice to regularly change based on a predetermined number of pictures.

25. A computer-readable non-transitory medium including computer-executable instructions that, when executed by a computer, cause the computer to perform operations for coding a video signal, the operations comprising:

dividing a coding target picture included in an input video signal into a plurality of slices each including one or more data blocks;

coding the video signal in a unit of the divided slice; and setting at least one of the division position of the slice and the number of divisions of the slice so that slice boundaries differ from each other between adjacent pictures.

26. A computer-readable non-transitory medium including computer-executable instructions that, when executed by a computer, cause the computer to perform operations for coding a video signal, the operations comprising:

dividing a coding target picture included in an input video signal into a plurality of slices each including one or more data blocks;

coding the video signal in a unit of the divided slice; and setting at least one of the division position of the slice and the number of divisions of the slice so that the division positions of the plurality of slices periodically change based on a predetermined number of pictures.

27. A computer-readable non-transitory medium including computer-executable instructions that, when executed by a computer, cause the computer to perform operations for coding a video signal, the operations comprising:

dividing a coding target picture included in an input video signal into a plurality of slices each including one or more data blocks;

coding the video signal in a unit of the divided slice; and causing at least one of the division position of the slice and the number of divisions of the slice to regularly change based on a predetermined number of pictures.

* * * * *